United States Patent
Kim

(10) Patent No.: US 10,698,508 B2
(45) Date of Patent: Jun. 30, 2020

(54) STYLUS PEN HOLDER

(71) Applicant: Kum Oh Electronics CO., LTD., Bucheon-si (KR)

(72) Inventor: Ki Sang Kim, Bucheon-si (KR)

(73) Assignee: KUM OH ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/371,630

(22) Filed: Apr. 1, 2019

(65) Prior Publication Data

US 2019/0384418 A1 Dec. 19, 2019

(30) Foreign Application Priority Data

Jun. 19, 2018 (KR) .................. 10-2018-0069979

(51) Int. Cl.
*G06F 3/039* (2013.01)
*F16F 3/12* (2006.01)
*F16M 11/20* (2006.01)
*G06F 3/0354* (2013.01)

(52) U.S. Cl.
CPC .............. *G06F 3/039* (2013.01); *F16F 3/12* (2013.01); *F16M 11/2057* (2013.01); *G06F 3/03545* (2013.01)

(58) Field of Classification Search
CPC ........ G06F 3/039; G06F 3/03545; F16F 3/12; F16M 11/2057; A47F 7/002; A47F 7/0028; B43M 99/003; B43M 99/007
USPC ................ 248/111, 109, 314; 211/69.1, 69.5
See application file for complete search history.

(56) References Cited

U.S. PATENT DOCUMENTS

| | | | | |
|---|---|---|---|---|
| 1,620,529 A | * | 3/1927 | Ferris ................... | B43M 99/003 211/69.5 |
| 1,860,853 A | * | 5/1932 | Cuthbert .............. | B43M 99/003 211/69.7 |
| 1,868,505 A | * | 7/1932 | Nakahara ............. | B43M 99/003 211/69.6 |
| 2,308,810 A | * | 1/1943 | Hull ..................... | B43M 99/003 211/69.7 |
| 3,655,062 A | * | 4/1972 | Curry ................... | B43M 99/003 211/69.6 |
| 4,548,325 A | * | 10/1985 | Hojer .................... | B43M 99/007 211/69.5 |
| 6,305,864 B1 | * | 10/2001 | Nguyen ................ | B43K 23/04 15/435 |
| 6,386,496 B1 | * | 5/2002 | Lai ........................ | E05C 19/022 24/629 |
| 6,585,210 B1 | * | 7/2003 | Lee ........................ | A47F 9/042 211/69.6 |

(Continued)

FOREIGN PATENT DOCUMENTS

CN 206465676 9/2017
CN 107521270 12/2017
(Continued)

*Primary Examiner* — Anita M King
(74) *Attorney, Agent, or Firm* — Cantor Colburn LLP

(57) ABSTRACT

Provided is a stylus pen holder, which includes a support having an elastic body with an elastic restoring force in a vertical direction, and a holder coupled to an upper end of the support and provided with a pen accommodation part having an upper surface input hole. Accordingly, a stylus pen such as a touch pen used with a smart phone or a tablet PC is safely stored or easily used in a public place such as an electronic product.

1 Claim, 4 Drawing Sheets

(56) References Cited

U.S. PATENT DOCUMENTS

| | | | | |
|---|---|---|---|---|
| 6,735,825 B1* | 5/2004 | Berman | ............... | B43K 23/001 |
| | | | | 211/69.1 |
| 7,377,717 B2* | 5/2008 | Clark | ..................... | E01F 9/629 |
| | | | | 116/63 R |
| 10,391,808 B2* | 8/2019 | Mitchell | ................ | B43K 23/04 |
| 2011/0261022 A1* | 10/2011 | Liang | ..................... | G06F 3/039 |
| | | | | 345/179 |

FOREIGN PATENT DOCUMENTS

| | | |
|---|---|---|
| JP | 06000792 | 1/1994 |
| JP | 09024692 | 1/1997 |
| JP | 2018092298 | 6/2018 |
| KR | 200197711 | 9/2000 |
| KR | 20050037198 | 4/2005 |
| KR | 20090011828 | 11/2009 |
| KR | 200477887 | 7/2015 |
| WO | 2016099145 | 6/2016 |

\* cited by examiner

STYLUS PEN HOLDER

BACKGROUND OF THE INVENTION

Field of the Invention

The present invention relates generally to a stylus pen holder. More particularly, the present invention relates to a stylus pen holder, which includes a support having an elastic body with elastic restoring force in a vertical direction, and a holder coupled to an upper end of the support and having a pen accommodation part with an upper surface input hole, whereby a stylus pen such as a touch pen used with a smart phone and a tablet PC can be safely stored or be easily used in a public place such as a showroom.

Description of the Related Art

As a typical example, a smart phone or a tablet PC, such as a notebook type computer sold by Samsung, is used with a stylus pen that is called as a touch pen in addition to a conventional input device such as a mouse and a keyboard.

Accordingly, in a showroom of electronic products, the stylus pen is provided together with a main device for display and application of the electronic products mentioned above.

The stylus pen is a precision electronic product that contains various electronic components unlike an ordinary writing tool, thus the stylus pen has a high risk of theft and has a great possibility of being broken or damaged due to dropping during use. Accordingly, the stylus pen should be safely stored and easily accessed in a public place such as the showroom.

In recent years, business operations have been simplified through electronic input using a tablet PC rather than handwriting input using an ordinary writing tool at a bank window. Therefore, techniques for reducing the risk of loss, theft, and breakdown of the stylus pen have become important.

However, in spite of this necessity, the stylus pen is simply connected to a holder through a wire for prevention of loss at an actual showroom or at a bank window, so security of the stylus pen depending on storage may be deteriorated.

As related art documents of the present invention, Korean Utility Model Application Publication No. 20-2009-0011828, Korean Utility Model Registration No. 20-0197711, and Korean Utility Model Registration No. 20-0477887 are known. However, the above related art documents propose devices allowing an ordinary writing tool such as a pencil or a ballpoint pen to be inserted and stored.

In this case, the stylus pen having a form of an ordinary writing tool may be stored without being separated from its original position. However, since security required when storing the stylus pen is different from security required for an ordinary writing tool, there is difficult to store the stylus pen by using these related arts. Especially, when the stylus pen is broken by not being precisely inserted or removed in up-and-down vertical direction, breakdown of the stylus pen or damage of inner components thereof occurs easily. Accordingly, it is necessary to develop a technique for storing the stylus pen exclusively and preventing the stylus pen from damage or breakdown during use.

The foregoing is intended merely to aid in the understanding of the background of the present invention, and is not intended to mean that the present invention falls within the purview of the related art that is already known to those skilled in the art.

Documents of Related Art (Patent document 1) Korean Utility Model Application Publication No. 20-2009-0011828, (Patent document 2) Korean Utility Model Registration No. 20-0197711, and (Patent document 3) Korean Utility Model Registration No. 20-0477887

SUMMARY OF THE INVENTION

Accordingly, the present invention has been made keeping in mind the above problems occurring in the related art, and the present invention is intended to propose a stylus pen (in this description, the stylus pen may be sometimes referred to as a touch pen) holder, wherein when the stylus pen used with a smartphone, a tablet PC, etc. is provided at a public place such as a showroom of electronic products or a bank window, and the stylus pen holder is capable of safely storing the stylus pen without separation of the stylus pen from its original position, preventing the stylus pen from damage or breakdown, regardless of an angle of inserting or removing the stylus pen, and always maintaining an upright state of the stylus pen for convenience of use.

In order to achieve the above object, according to one aspect of the present invention, there is provided a stylus pen holder, which includes: a support including an elastic body having elastic restoring force in a vertical direction; and a holder coupled to an upper end of the support and provided with an accommodating part having an upper surface input hole.

Wherein, in the stylus pen holder, the support may include: a base plate; an elastic rod installed on an upper part of the base plate, connected to a lower surface of the holder, and made of a material with predetermined elasticity; and a coil spring fitted over the elastic rod to surround an outer surface of the elastic rod and elastically supporting the holder upwardly.

Wherein, in the stylus pen holder, the holder may include: an insert rubber having the input hole and made of a material with predetermined elasticity; and an inner container coupled to a lower part of the insert rubber and providing the accommodating part.

According to the present invention, since the stylus pen holder is configured such that the holder is coupled to the upper part of the support having the elastic restoring force in the vertical direction, the stylus pen stands upright in a state of being inserted in the holder and is easily removed therefrom to be used. When the stylus pen is inserted or removed in a tilted state, the holder changes its angle in correspondence with an angle of the stylus pen, thereby preventing the stylus pen from damage by being broken and breakdown.

Since a middle part of the stylus pen inserted in the holder and a lower part of the holder are supported by the elastic rod and the coil spring of the support, and by the elastic rubber of the holder, when inserting or removing the stylus pen in a tilted state, the angles of the support and the holder are naturally changed into optimum angles and then restored to their original states. Thus, the stylus pen can be prevented from damage and breakdown even through the stylus pen is frequently used.

In addition, in the stylus pen holder, since an outer container supports the holder at two points by supporting the upper and lower ends of the holder, an inner container is prevented from shaking, thus the stylus pen can always stand upright in the vertical direction and be used more conveniently.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1A:
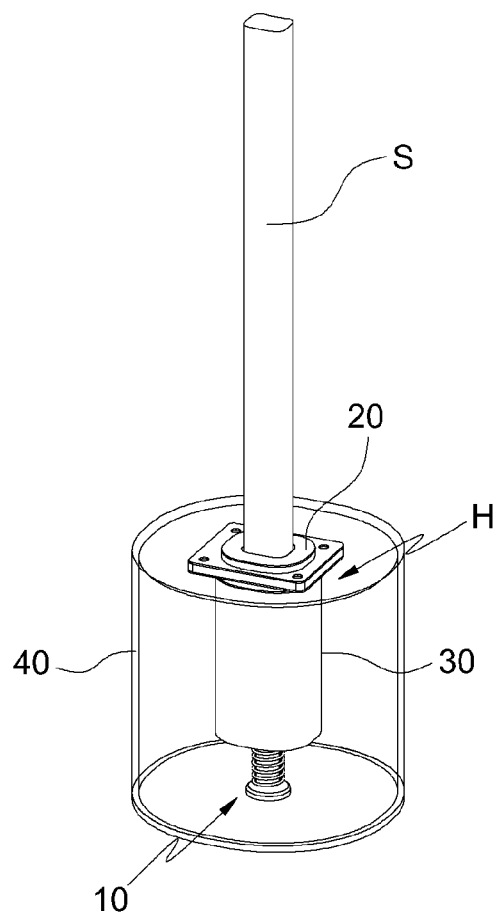
FIGS. 1A and 1B are perspective views showing a stylus pen holder according to an exemplary embodiment of the present invention.
Figure 1B:
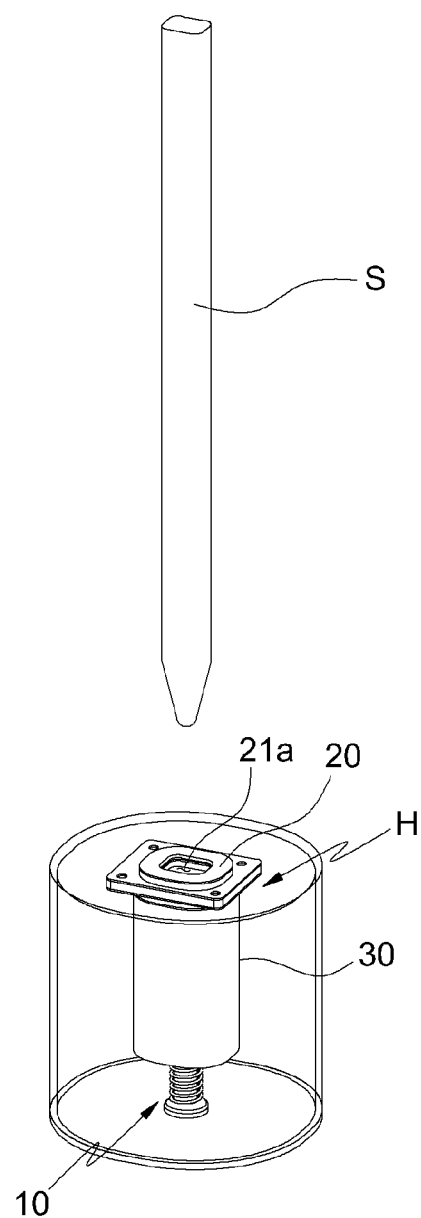
Figure 2:
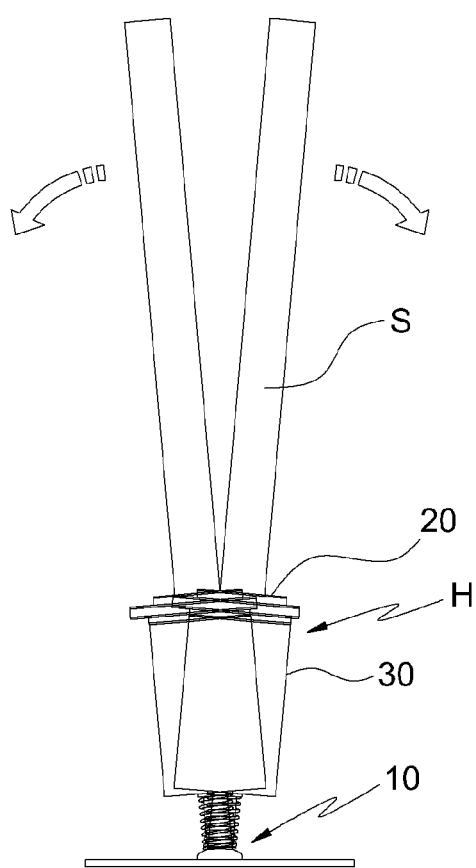
FIG. 2 is a front view showing a main part of the stylus pen holder according to the present invention.
Figure 3:
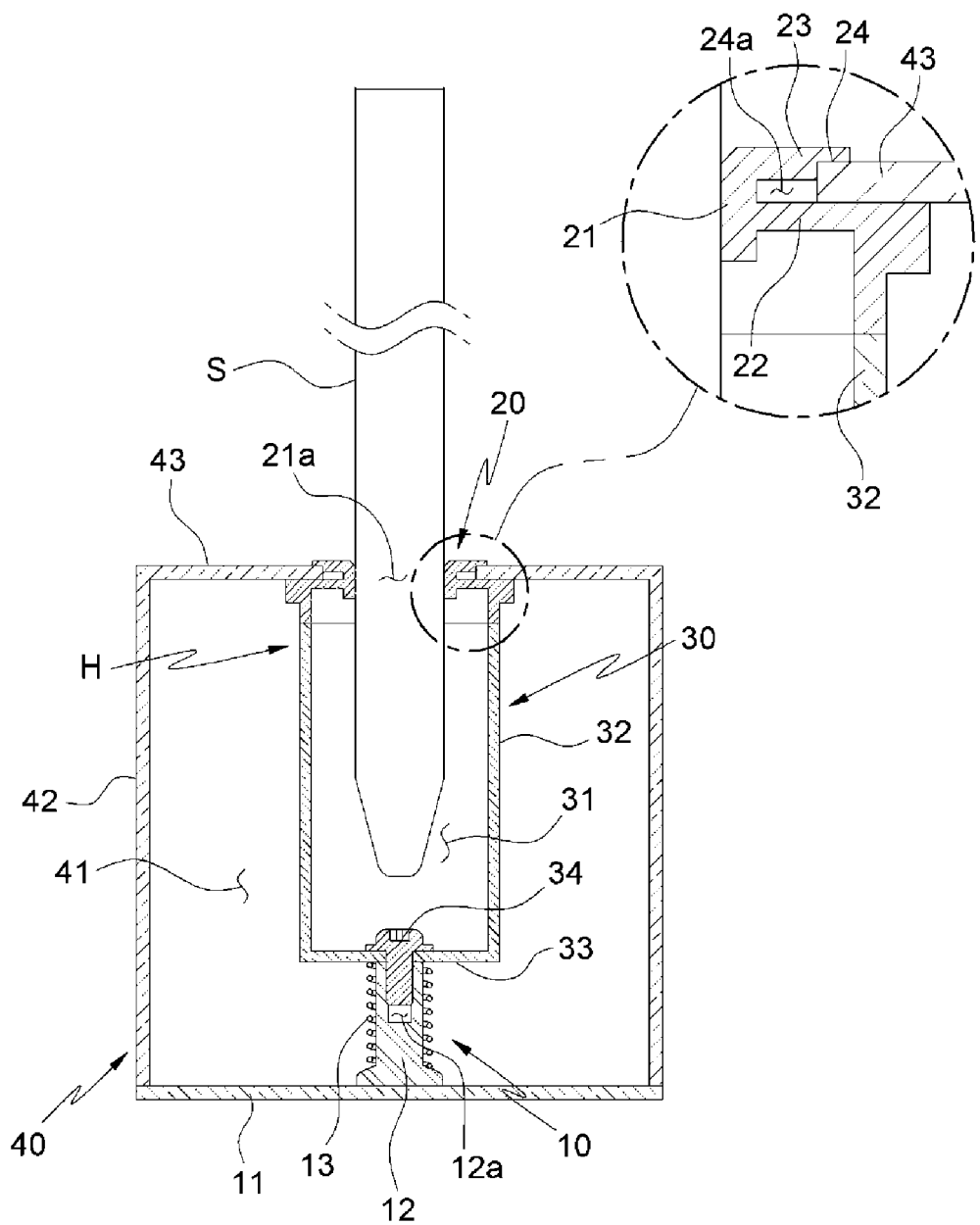
FIG. 3 is a cross-sectional view showing the stylus pen holder according to the present invention.

The present invention will now be described in detail on the basis of aspects (or embodiments). The present invention may, however, be embodied in many different forms and should not be construed as being limited to only the embodiment set forth herein, but should be construed as covering modifications, equivalents or alternatives falling within ideas and technical scopes of the present invention.

In the drawings, like reference numerals, particularly, reference numerals having the same last two digits or the same last two digits and letters, refer to like elements having like functions throughout, and unless the context clearly indicates otherwise, elements referred to by reference numerals of the drawings should be understood on the basis of this standard.

Also, for convenience of understanding of the elements, in the drawings, sizes or thicknesses may be exaggerated to be large (or thick), may be expressed to be small (or thin), or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise.

It will be further understood that the terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Terms such as 'a first ~' and 'a second ~' are used only for the purpose for distinguishing a constitutive element from other constitutive elements, but the constitutive element should not be limited to a manufacturing order, and the terms described in the detailed description of the invention may not be consistent with those described in the claims.

For convenience of the description of a stylus pen holder according to the present invention, when an approximate direction rather than a precise direction is specified with reference to FIG. 1A (for convenience of understanding, an outside container 40 is illustrated transparently in the drawing), a lower side is determined on the basis of a direction to which gravity is applied, and up and down directions and right-and-left directions are determined on the basis of the lower side. This standard may be also applied to the other drawings, and directions may be specified and described on the basis of this standard unless the detailed description of the invention and the claims specially indicate otherwise.

Hereinbelow, the stylus pen holder according to the exemplary embodiment of the present invention will be described in detail with reference to the accompanying drawings.

As shown in FIGS. 1A to 3, the present invention relates to a stylus pen holder capable of safely storing or removing a stylus pen used with a smart phone or in a tablet PC having a notebook size, and allowing the stylus pen to be stored therein or used. The stylus pen holder includes a support 10 elastically supporting a holder H, an insert rubber 20 and an inner container 30 constituting the holder H in which the stylus pen S is inserted, and an outside container 40 preventing the holder H from shaking.

In the present invention, a form and size of the stylus pen S are not limited, and when the stylus pen holder is used in exhibition halls or bank windows, it may be prevented from being lost by being connected with a security wire.

The support 10 includes an elastic body having the elastic restoring force in a vertical direction.

Specifically, the support 10 includes a base plate 11, an elastic rod 12 which is installed on an upper part of the base plate 11 and is connected to a lower surface of the holder H and is made of a material with predetermined elasticity, and a coil spring 13 fitted over the elastic rod 12 to surround an outer surface of the elastic rod 12 and elastically supporting the holder H upwardly. Thus, the elastic rod 12 and the coil spring 13 function as the elastic body for elastically restoring the holder H in the vertical direction.

The base plate 11 is fixed on a display table or a desk, and the elastic rod 12 is installed in the vertical direction at a center of an upper surface of the base plate 11.

The elastic rod 12 is made of a flexible material such as a rubber material or a silicon material. A slope of the elastic rod 12 is changed as external force is applied thereto, and is restored to the vertical direction as the external force is removed.

The coil spring 13 provides an elastic force in a direction opposite to a compressive direction, and fits around the elastic rod 12 and supports a base part 33 of the holder H (the inner container 30) and the base plate 11 by its upper and lower ends. When a descending pressure (or tilting pressure) is applied to the holder H, a compression length of the coil spring 13 is changed along with the elastic rod 12 therein, and when the external force is removed, the coil spring 13 is elastically restored to its original length and supports the holder H to be installed in the vertical direction.

The holder H is coupled to the upper end of the support 10 and is provided with an accommodating part for the stylus pen having an upper input hole 21a.

Specifically, the holder H includes the insert rubber 20 having the input hole 21a and formed of a material having predetermined elasticity, and the inner container 30 connected to a lower part of the insert rubber 20 and provided with the accommodating part 31.

The inner container 30 is a cylindrical member made of an inner surface part 32 and the base part 33, thereby providing the accommodating part 31 which has an open upper surface and is longer than a predetermined length in the vertical direction. Here, the insert rubber 20 is coupled to the open part of the accommodating part 31 to seal the accommodating part 31, and allows the input hole 21*a* and the accommodating part 31 to communicate with each other.

As shown in the accompanying drawings of the description, although the embodiment is described in an example in which an inner diameter of the inner surface part 32 of the inner container 30 is larger than an outer diameter of the stylus pen S, the inner diameter of the inner surface part 32 may be the same as the outer diameter of the stylus pen S. That is, the input hole 21*a* of the insert rubber 20 and the accommodating part 31 of the inner container 30 may have the same diameter.

However, when the accommodating part 31 is made wider than the input hole 21*a*, accommodation of the stylus pen S through the insert rubber 20 may be more comfortable.

The insert rubber 20 is formed of the flexible material such as the rubber material or the silicon material, and provided with the input hole 21*a* at the center through which opposite sides of the insert rubber 20 penetrate. In addition, the insert rubber 20 is coupled to an upper end of the inner surface part 32 of the inner container 30 by adhesion or welding so that the input hole 21*a* and the accommodating part 31 communicate with each other.

In the insert rubber 20, a slope part is provided at an upper end of an inner circumferential surface of the input hole 21*a* so that an inner diameter of the upper end of the input hole 21*a* is gradually extended to the top. Thus, in the case of inserting or removing the stylus pen S by tilting it at a predetermined angle, elastic deformation of the insert rubber 20 primarily corresponds to a slope of the stylus pen S, and elastic deformation of the elastic rod 12 and the coil spring secondarily correspond to a slope beyond an elastic deformation limit of the insert rubber 20, so that a slope of the entire holder is changed.

For example, when the stylus pen S placed in the holder is removed in a tilted direction toward a first side (a right side in the drawings), not the vertical direction, and when the slope of the stylus pen S is small, the stylus pen S may be removed while deforming only a form of the insert rubber 20, that is, a form of the input hole 21*a*, without changing the slope of the holder H. When the stylus pen S is removed at a slope larger than a shape deformation limit of the input hole 21*a*, the form of the input hole 21*a* is primarily deformed, and at the same time, the inner container 30 is tilted to the right side on the axis of the elastic rod 12, whereby the stylus pen S may be removed from the holder.

After removing the stylus pen S, as the insert rubber 20 and the inner container 30 are restored to original states in the up-and-down vertical direction, the used stylus pen S may be easily inserted in the holder again. In addition, when the stylus pen S is inserted into the holder at the tilted angle, as the inner container 30 and/or the insert rubber 20 are/is elastically deformed corresponding to the slope of the stylus pen S through the structure described above, the stylus pen S is restored to the original state in the vertical direction after being inserted in the holder, so the stylus pen S may be safely stored and conveniently used.

Particularly, since the holder H according to the present invention is free to change the angle as described above, even when the stylus pen S is inserted therein or removed from the holder H, the input hole 21*a* and the accommodating part 31 may be deformed in directions corresponding to the slope of the stylus pen S thereby preventing the stylus pen S from damage by being broken and breakdown.

That is, when the holder H is set in the up-and-down vertical direction, and when the stylus pen S is inserted therein or removed therefrom in the tilted state, since a direction of inserting/removing the stylus pen S and directions of the input hole 21*a* and the accommodating part 31 are different from each other, the stylus pen S may be damaged or broken as it is bent under pressure on the axis of the input hole 21*a*. However, the present invention can prevent above problem by providing the holder H which may freely change its direction through the insert rubber 20 and the support 10.

Moreover, for coupling the inner container 30 and the support 10, the base part 33 of the inner container 30 is provided with an insert hole at the center through which opposite sides of the base part 33 penetrate, and an upper end of the elastic rod 12 is provided with a screw hole 12*a* perforated in a longitudinal direction to communicate with the insert hole. Therefore, the inner container 30 and the support 10 are coupled to each other such that a bolt 34 is inserted into the insert hole from the inside of the accommodating part 31 and screwed into the screw hole 12*a*.

Although not shown in the accompanying drawings, at a lowermost end of the accommodating part 31, that is, an upper part of the bolt 34, an elastic protection member may further provided to cover an end of the stylus pen S for protection.

Meanwhile, when the holder H is elastically restored to the original state after inserting or removing the stylus pen S in the tilted state, elasticity of the elastic rod 12 and the coil spring 13 is not reduced so that the holder H may continue to shake.

Accordingly, the holder H of the present invention further includes the outside container 40 which enables elastic deformation of the insert rubber 20 and the holder H while preventing the holder H from shaking.

The outside container 40 is made of an outer wall part 42 spaced apart outwardly from the support 10 by a predetermined distance to provide a rotation space part 41 accommodating the support 10 and the inner container 30 therein, and of an upper surface part 43 connecting entirely an upper end of the outer wall part 42 and coupled to the insert rubber 20.

A base of the outside container 40 is substituted by the base plate 11 of the support 10, and an inner diameter of the outer wall part 42 is provided larger than an outer diameter of the inner container 30 to provide the rotation space part 41 required for tilt of the holder H.

In addition, for coupling the holder H and the outside container 40 and preventing shaking of the holder H, the insert rubber 20 includes a body part 21 provided with the input hole 21*a*, a support part 22 protruding from a lower end of an outer circumferential surface of the body part 21, a cap part 23 protruding from an upper end of the outer circumferential surface of the body part 21, and an insert part 24 formed between the support part 22 and the cap part 23 and in which the upper surface part 43 is inserted.

The insert part 24 provides an elastic space part 24*a* while the body part 21 and the upper surface part 43 are spaced apart from each other by the predetermined distance.

The outside container 40 has an open hole at the center of the upper surface part 43, through which opposite sides of the upper surface part 43 penetrate. Here, the insert rubber 20 is fitted to the open hole thereby coupling the holder H and the outside container 40 to each other.

Specifically, the insert rubber 20 is formed into a 'H' shaped form having a cross-section in which the insert part 24 is disposed in a left and right horizontal direction and open at outside ends. The insert part 24 is provided deeply so that an inside end of the upper surface part 43 does not contact the body part 21. Thus, the elastic space part 24a is provided between the body part 21 and the upper surface part 43.

The insert rubber 20 is coupled to the outside container 40 such that the upper surface part 43 of the outside container 40 is forcibly fitted between the support part 22 and the cap part 23. Accordingly, the inner container 30 is provided in the outside container 40 by being supported at two points by supporting vertical opposite ends through the support 10 at a lower end and the insert rubber 20 at an upper end.

Accordingly, when inserting or removing the stylus pen S, with the method described above, the direction of the input hole 21a and the accommodating part 31 changes in accordance with the slope of the stylus pen S. In addition, tilt change of the insert rubber 20 occurs as shapes of the support part 22 and the cap part 23 change by the elastic space part 24a, and tilt change of the inner container 30 is provided by difference in size from the outside container 40.

Here, since the insert rubber 20 is locked to the upper surface part 43 of the outside container 40, the holder H, more strictly, the inner container 30 changes its direction while a lower end of the inner container 30 is tilted on the axis of the insert rubber 20, rather than an upper end thereof being tilted on the axis of the elastic rod 12.

That is, the inner container 30 is operated such that a lower end thereof is turned to one side while an upper end thereof is fixed on the upper surface part 43 of the outside container 40 by the insert rubber 20 so that forms of the elastic rod 12 and the coil spring 13 are deformed to change the slope thereof.

In addition, when the outer force is removed after inserting or removing the stylus pen S from the holder, as described above, the inner container 30 is restored to the original position in the vertical direction by the elasticity of the elastic rod 12 and the coil spring 13. Here, since the upper end of the inner container 30 is fixed to the outside container 40, shaking due to the elastic force occurs only at the lower end of the inner container 30 in the outside container 40. However, since the input hole 21a is fixed at the center of the outside container 40, the stylus pen S may be inserted in or removed from the holder regardless of whether or not the inner container 30 is shaken, and the stylus pen S may also stand upright without shaking.

Although the stylus pen holder according to the preferred embodiment of the present invention has been described for illustrative purposes, those skilled in the art will appreciate that various modifications, additions, and substitutions are possible, and such modifications, additions, and substitutions are to be interpreted as belonging to the scope of the present invention.

What is claimed is:

1. A stylus pen holder comprising:
   a support having elastic restoring force in a vertical direction, wherein the support includes: a base plate; an elastic rod installed on an upper part of the base plate and made of a material having a predetermined elasticity; and a coil spring fitted over the elastic rod to surround an outer surface of the elastic rod; and
   a holder coupled to an upper end of the support and elastically supported by the support, the holder having an accommodating part, wherein the holder includes: an inner container forming the accommodating part; an insert rubber disposed at an upper end of the inner container and made of a material having a predetermined elasticity; and an upper surface input hole formed in the insert rubber so that a stylus pen is inserted into the upper surface input hole.

* * * * *